United States Patent
Schmidheiny et al.

(10) Patent No.: US 10,434,695 B2
(45) Date of Patent: Oct. 8, 2019

(54) METHOD FOR OPERATING AN INJECTION MOULDING MACHINE

(71) Applicant: NETSTAL-MASCHINEN AG, Näfels (CH)

(72) Inventors: Eric Schmidheiny, Sinzheim (DE); Manuel Hausammann, Wil (CH)

(73) Assignee: Netstal-Maschinen AG, Näfels (CH)

( * ) Notice: Subject to any disclaimer, the term of this patent is extended or adjusted under 35 U.S.C. 154(b) by 244 days.

(21) Appl. No.: 15/319,679

(22) PCT Filed: Jun. 19, 2015

(86) PCT No.: PCT/EP2015/063792
§ 371 (c)(1),
(2) Date: Dec. 16, 2016

(87) PCT Pub. No.: WO2015/197480
PCT Pub. Date: Dec. 30, 2015

(65) Prior Publication Data
US 2017/0136672 A1 May 18, 2017

(30) Foreign Application Priority Data
Jun. 23, 2014 (DE) .................. 10 2014 108 730

(51) Int. Cl.
*B29C 45/76* (2006.01)
(52) U.S. Cl.
CPC ........ *B29C 45/7666* (2013.01); *B29C 45/766* (2013.01); *B29C 2945/7603* (2013.01);
(Continued)
(58) Field of Classification Search
CPC .............. B29C 45/7666; B29C 45/766; B29C 45/7606; B29C 45/76113; B29C 45/7623;
(Continued)

(56) References Cited

U.S. PATENT DOCUMENTS 4,904,913 A * 2/1990 Jones .................. B29C 45/7666
318/560
5,863,475 A * 1/1999 Ueda ...................... B29C 45/80
264/328.1
(Continued)

FOREIGN PATENT DOCUMENTS

AT 502 382 B1 3/2007
AT 12 820 U1 12/2012
(Continued)

OTHER PUBLICATIONS

International Search Report issued by the European Patent Office in International Application PCT/EP2015/063792.
(Continued)

*Primary Examiner* — Jacob T Minskey
*Assistant Examiner* — Cedrick S Williams
(74) *Attorney, Agent, or Firm* — Henry M. Feiereisen LLC

(57) ABSTRACT

A method is described for operating an injection moulding machine, which has one or more movable machine parts which can be moved by suitable drives along specifiable travelling distances. Movement of a movable machine part is repeated cyclically. In order to reduce the movement times of the movable machine parts to a minimum, provision is made for one or more of the movable machine parts to successively reduce the power reserves of one or more of the drives associated with a movable machine part, until a specifiable minimum of power reserve is reached, wherein the minimum can be zero. In each cycle, the power reserve of the drive or drives is determined and is successively reduced, in particular from cycle to cycle. A movable platen, an ejector, a core puller, a plasticizing screw and/or an injection piston can be provided as movable machine part.

21 Claims, 3 Drawing Sheets

(52) U.S. Cl.
CPC ............. *B29C 2945/7623* (2013.01); *B29C 2945/76113* (2013.01); *B29C 2945/76387* (2013.01); *B29C 2945/76521* (2013.01); *B29C 2945/76561* (2013.01); *B29C 2945/76598* (2013.01); *B29C 2945/76709* (2013.01); *B29C 2945/76866* (2013.01); *B29C 2945/76936* (2013.01)

(58) Field of Classification Search
CPC ........ B29C 45/76387; B29C 45/76521; B29C 45/76561; B29C 45/76598; B29C 45/76709; B29C 45/76866; B29C 45/76936
See application file for complete search history.

(56) References Cited

U.S. PATENT DOCUMENTS

| | | | |
|---|---|---|---|
| 6,144,182 A | 11/2000 | Totani et al. | |
| 6,526,360 B1 | 2/2003 | Ito et al. | |
| 2010/0112113 A1 | 5/2010 | Tobita et al. | |
| 2012/0009297 A1* | 1/2012 | Ochi | B29C 45/7666 425/556 |

FOREIGN PATENT DOCUMENTS

| | | | |
|---|---|---|---|
| DE | 3032407 | 3/1982 | |
| DE | 699 02 744 | 1/2003 | |
| DE | 102006041579 A1 * | 3/2007 | ........... B29C 45/766 |
| DE | 10 2012 111 046 | 5/2014 | |
| EP | 1346812 A1 * | 9/2003 | ........... B29C 45/766 |
| EP | 1 346 812 | 8/2011 | |
| JP | 2010-240915 | 10/2010 | |

OTHER PUBLICATIONS

"Die intelligenten Sprinter" published in the journal "Kunststoffe Jul. 2008", pp. 50 to 53, Carl Hanser Verlag, Munich.

* cited by examiner

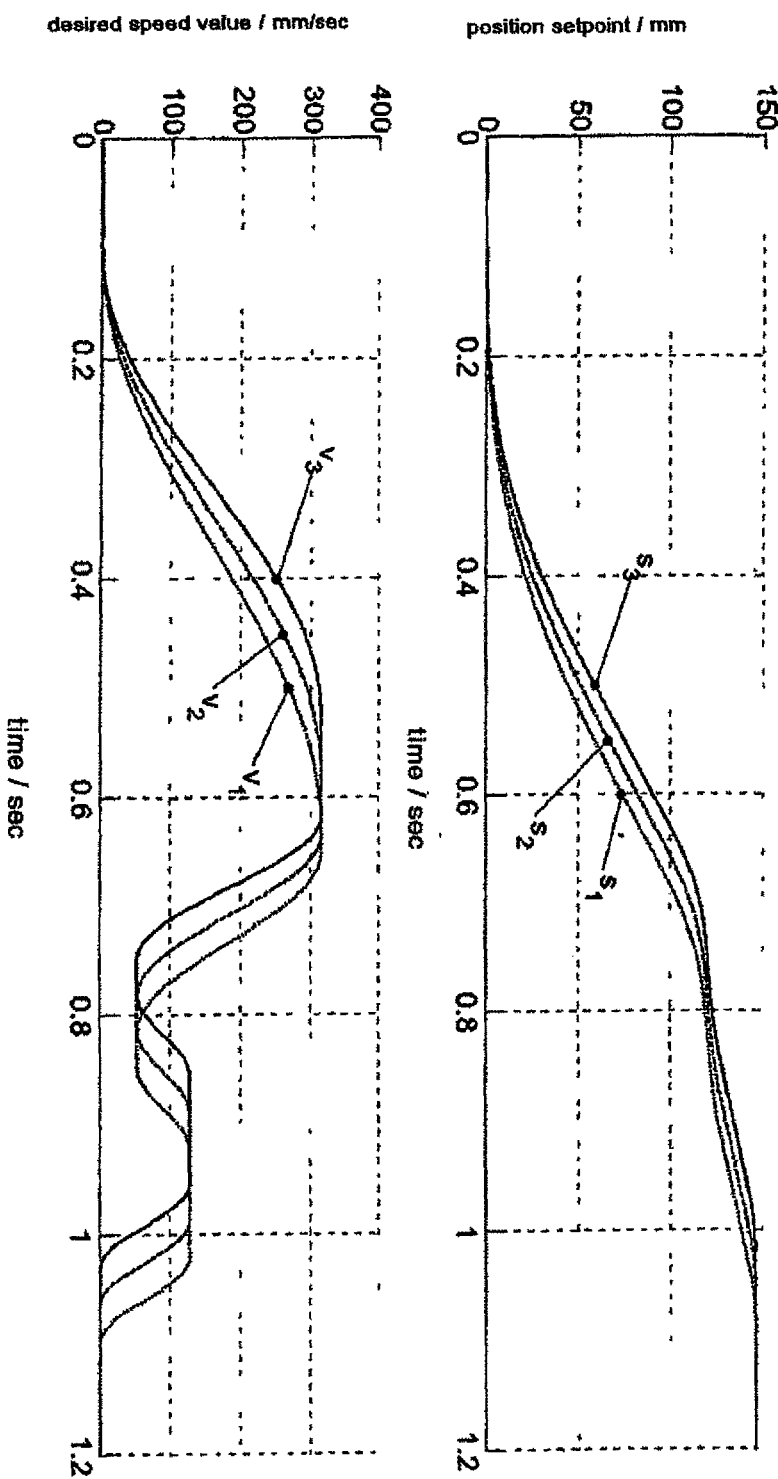

METHOD FOR OPERATING AN INJECTION MOULDING MACHINE

CROSS-REFERENCES TO RELATED APPLICATIONS

This application is the U.S. National Stage of International Application No. PCT/EP2015/063792, filed Jun. 19, 2015, which designated the United States and has been published as International Publication No. WO 2015/197480 A1 which claims the priority of German Patent Application, Serial No. 102014108730.5, filed Jun. 23, 2014, pursuant to 35 U.S.C. 119(a)-(d).

BACKGROUND OF THE INVENTION

The invention relates to a method for operating an injection moulding machine.

It is known to parameterize the preselected target value of an electrically or hydraulically driven clamping unit of an injection moulding machine so that the maximum permissible weight of a moulding tool can be moved with the maximum stroke with the installed power. Thereby, especially in the case of the use of light tools and small strokes, power reserves result on the drive, which remain unused today.

The document EP1346812B1 discloses a method for the energy-oriented optimization of cylically running machine processes, in particular of injection moulding processes on injection moulding machines for the processing of plastics. Through an optimization of various setting parameters, a smaller energy consumption is to be achieved. For this, with existing process settings and actual values additionally on the machine a more or less differentiated effective power measurement is carried out in real time during the running cyclical process on the machine, and the results thereof are made available to the control of the machine for further processing via an analog or digital interface.

The document AT502382B1 discloses a method for controlling and/or regulating an injection moulding machine, which has a toggle lever mechanism with a crosshead. Restriction values for the movement of the movable platen and restriction values for the movement of the crosshead are established. Finally, a time-optimal movement trajectory is calculated numerically and stored. Subsequently, the controlling and/or regulating of the drive device of the injection moulding machine takes place along the stored movement trajectory. This method is also described in the journal "Kunststoffe 7/2008", pages 50 to 53, Carl Hanser Verlag, Munich in the article with the title "Die intelligenten Sprinter". It is stated there (page 52, left-hand column), that the method designated as "Active Speed Setup" is constructed on a mathematical model in which all physical influencing variables such as jerk, acceleration and speed are used as the starting basis for the calculation of correcting variables for the regulation of the drive system. In a first step, taking into consideration these influencing variables the most favourable forecasted movement (trajectory) is calculated for the toggle lever. In a second step, the actual movement of the toggle lever with suitable control concepts is brought to the calculated time-optimal forecasted movement.

SUMMARY OF THE INVENTION

Proceeding from the above-mentioned prior art, the invention is based on the problem of indicating a method for operating an injection moulding machine by which the movement times of movable machine parts, in particular of the movable platen, can be minimized.

To solve this problem, it is proposed according to the invention, for one or more of the machine parts, to successively reduce the power reserves of one or more of the drives associated with a movable machine part, until a specifiable minimum of power reserve is reached, wherein the minimum is preferably close to or equal to zero. Preferably, the minimum can be less than 10% of the maximum available power, particularly preferably less than 5% of the maximum available power. The minimum, however, can also be equal to zero. Ideally, at the end of the optimization process, the drive of a particular movable machine part is operated with the maximum available power. If several drives are provided on one and the same machine part, this preferably applies to all drives or respectively the respective power reserve is reduced accordingly for each of the drives. Other aspects, such as for example the energy consumption, remain unconsidered here.

According to a preferred embodiment, in each cycle the power reserves of the drive or drives are determined and the power reserves are reduced successively, in particular from cycle to cycle. The reduction of the power reserves can therefore take place over several cycles. In so doing, preferably a cycle-overlapping approximation to the power maximum of the drive is to take place or respectively in a cycle-overlapping manner the power reserve present in an actual case of application is to be minimized, if applicable until no more power reserves are present.

Other time intervals can also be specified for the determining of the power reserves than one cycle. Consequently, it is also possible to determine the power reserves only in every second, third, fourth, . . . cycle. Likewise, it is possible to determine the power reserves in other regular or also in irregular time intervals. For example, it would be conceivable to determine the power reserves after the first cycle, after the third cycle, after the fourth cycle, after the sixth cycle, after the seventh cycle, etc. This would produce the following series, wherein Z is to denote the cycle and LR the step of determining the power reserve: Z1-LR-Z2-Z3-LR-Z4-LR-Z5-Z6-LR-Z7-LR- . . . . In general terms, the power reserves are determined from time to time or respectively at particular specifiable points in time.

The power reserves should expediently always be determined after reaching the same point in time within a cycle. Preferably, the power reserves are determined at the end of a cycle or respectively after reaching the point in time which corresponds to the end of a cycle. This can be, for example, the point in time when a movement is terminated. However, it can also be applied to a particular point in time in the course of a cycle.

Alternatively, the reaching of a particular state of a movable machine part can be taken as the point in time for determining the power reserves, for example the state as is present when an end of a desired travelling distance of a movable machine part has been reached. By the application to a particular state of the machine part, one avoids problems if one applies a point in time in the cycle and the cycle time is subject to fluctuations. The reaching of a particular position on the travelling path can be understood as a state, as for example mentioned above, the reaching of an end of a travelling distance. However, not only the reaching of a particular position can be understood as a "state of the movable machine part", but also other situations can be understood as "state of the movable machine part" in which the machine part under consideration is situated. For example, it could be regarded and thus understood as a "state of the movable machine part" when the movable machine part is situated in a state in which the clamping unit is held shut and a particular value of clamping force has been built up.

In order to quickly minimize the power reserves, a reduction of the power reserves beginning after the first cycle and continuously from cycle to cycle up to a specifiable minimum is expedient. This, of course, also presupposes a corresponding determining of the power reserves from cycle to cycle. However, it is also possible to undertake the reduction of the power reserves not after each cycle, but rather in other regular or else irregular time intervals, It is, of course, necessary here that respectively before a reduction of the power reserves a determining is undertaken of the power reserves which are then still present.

The power reserves of one or more of the drives associated with a movable machine part are therefore determined from time to time and are reduced successively, until a specifiable minimum of power reserve is reached.

When several drives are associated with a movable machine part, various embodiments of the method according to the invention are possible. According to one embodiment, the individual power reserves can be determined and considered individually. In this case, the power reserves of the individual drives could be determined independently of one another and successively reduced. Here, for each drive the same minimum of power reserve can be specified, or a distinct, individual minimum of power reserve can be specified individually for each drive. According to another embodiment, it is possible to form a total from the power reserves of the individual drives and to successively reduce this total until a specifiable minimum has been reached in relation to this total of the power reserves. It can also be stated that in this case an overall minimum is specified. If applicable, hybrid forms of the above-mentioned embodiments can also come into consideration. If more than two drives are provided for the moving of a movable machine part, the first above-mentioned embodiment could be used for one drive, for example, and the second of the above-mentioned embodiments could be used for the other drives. If several drives act on a movable machine part or respectively drive the latter and are to move along a travelling distance, suitable gears can be provided, in order to realize the operative connection of the several drives with the machine part and, if applicable, between the drives with respect to one another. Depending on the arrangement of the axes or respectively of the movable machine parts, different variants of the method according to the invention can be realized. In particular, depending on the number of drives provided for a movable machine part and to be acting on this machine part, different combinations of the above-mentioned embodiments can come into use.

The determining of the power reserves can preferably take place such that during the movement of the machine part along a specified travelling distance, one or more physical parameters are measured continuously, which are suitable for determining the power of the drive or drives. To achieve a plurality of measurement values, the measuring can take place in short time intervals, for example at millisecond intervals.

According to a further embodiment, the measurement values can be evaluated at the end of the travelling distance and a calculation can take place of the power reserves for the movement carried out along this travelling distance. Thereby—in so far as power reserves have been determined—for carrying out the movement in a later cycle, in particular in the next cycle, the power reserves can be reduced or respectively a greater power is made available for moving the machine part. The power reserves can be reduced until the maximum available power of a drive is taken for moving the machine part.

The invention is suitable both for electric injection moulding machines and also for hydraulic injection moulding machines. Consequently, one or more electric drives or one or more hydraulic drives can be provided, in order to move a machine part which is to be moved, such as e.g. a platen or an ejector. Basically, however, hybrid forms are also conceivable, i.e. the use of electric and of hydraulic drives.

A preferred field of application is the moving of the movable platen. Consequently, the movable platen can be regarded here as a movable machine part. The movable platen is moved with the moulding part of an injection moulding tool situated thereon along a specifiable travelling distance or respectively stroke cyclically towards and away from the fixed platen. The power reserve of the drive or drives of the movable platen can be determined at the end of the closing and/or at the end of the opening. For a specified travelling distance, preferably firstly a course of a desired speed value is specified and the course of the desired speed value is successively altered according to the available power reserves, and namely such that the time for covering the travelling distance is successively reduced.

A central idea of the invention therefore lies in reducing as far as possible the movement times of the movable platen for each case of application of a clamping unit of an injection moulding machine. The case of application is predetermined by the injection moulding tool and its operation. This means that the tool has a particular weight and is moved open and closed over a particular travelling distance or respectively stroke. For a particular tool weight and a particular stroke or respectively travelling distance, the shortest possible travel time of the movable platen can be achieved by means of the invention, and namely preferably both for the closing and for the opening. For this, provision is made according to the invention, to determine and minimize the power reserves of the drive of the movable platen for a particular case of application. In particular with the use of relatively light injection moulding tools and with small strokes or respectively short travelling distances, power reserves result which can be utilized.

The invention is not restricted to the moving of the movable platen. In an analogous manner, the moving of an ejector, of a core puller, of a plasticizing screw and/or of an injection piston can be optimized. For these movable machine parts also preferably firstly a course of a desired speed value can be specified and the course of the desired speed value can be altered successively according to the available power reserves, and namely such that the time for covering the respective travelling distance is successively reduced. The desired speed value can be processed by integration over time to a position setpoint, whereby the movable machine part can be operated in a position-controlled manner. Basically, the invention is able to be applied to all movable machine parts which are moved cyclically forward and back along travelling distances.

The moving can preferably take place along an axis, i.e. on a linear travelling path. Furthermore, preferably at the end of the forward movement and/or at the end of the backward movement, the power reserve can be determined.

BRIEF DESCRIPTION OF THE DRAWINGS

The invention is to be described in further detail below with the aid of example embodiments and with reference to FIGS. 1 to 4. There are shown:

FIG. 4a, 4b: different movement profiles for different power reserves with illustration of the respective desired speed value course in FIG. 4a and illustration of the respective position setpoint course in FIG. 4b.

DETAILED DESCRIPTION OF THE EMBODIMENTS

Figure 1:
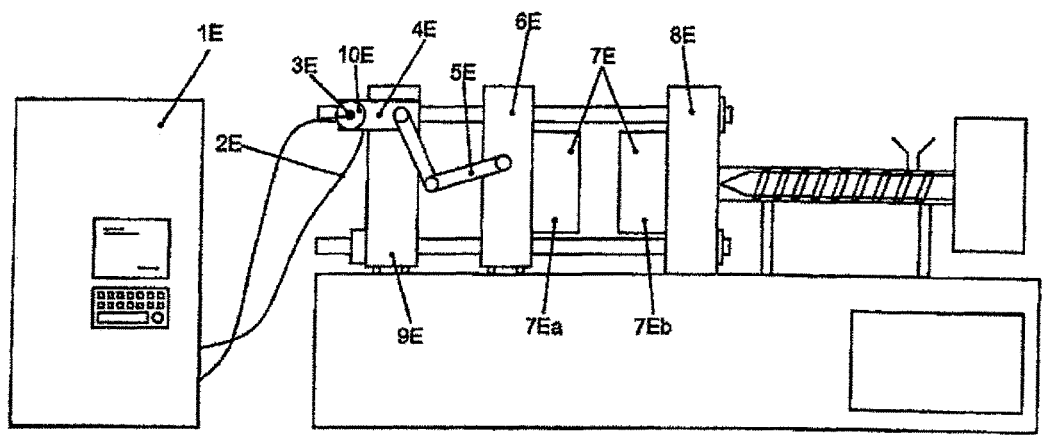
FIG. 1: a diagrammatic illustration of an electric injection moulding machine with an electric drive

FIG. 1 shows an embodiment of an electric injection moulding machine with a toggle lever clamping unit. A fixed platen 8E, a movable platen 6E and a support plate 9E are arranged on a machine bed. The support plate 9E is also mounted displaceably on the machine bed for purposes of mould height adjustment. An injection moulding tool 7E comprises mould halves 7Ea and 7Eb, wherein one mould half, namely the movable mould half 7Ea, is fastened on the movable platen SE and the other, fixed mould half 7Eb is fastened on the fixed platen. A toggle lever system 5E is provided between the support plate 9E and the movable platen 6E. An electric motor 4E serves for actuating the toggle lever system. Electromotively driven toggle lever systems are known in various configurations to the specialist in the art, so that no further explanations are necessary here. In particular, the structural details of a toggle lever system and the way in which the electric motor 4E is connected with the toggle lever system with regard to drive are known to the specialist in the art, in order to move it from a folded position, which corresponds to an open position of the clamping unit, into an extended position, which corresponds to a closed position of the clamping unit, and vice versa. A rotary encoder 3E and a current measurement device 10E are provided on the electric motor 4E. The prevailing rotation speed n can be determined via the rotary encoder 3E, the current measurement device 10E measures the prevailing current intensity I. The rotation speed n and the current intensity I are fed to a machine control 1E and are evaluated there, which is described in further detail below in connection with FIG. 3. The electric motor 4E is supplied with control signals from the machine control 1E via a line 2E.

Figure 2:
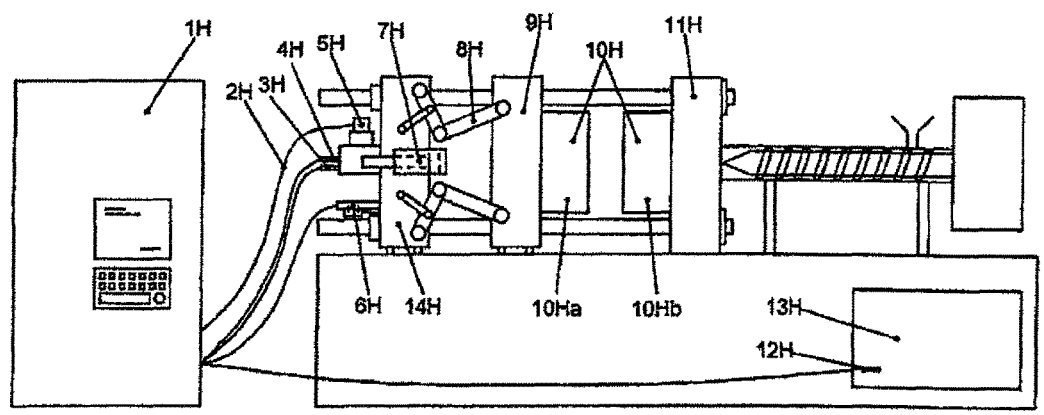
FIG. 2: a diagrammatic illustration of a hydraulic injection moulding machine with a hydraulic drive

The hydraulic injection moulding machine shown in FIG. 2 is likewise equipped with a three-plate clamping unit. It comprises a fixed platen 11H with a mould half 10Hb, a movable platen 9H with a movable mould half 10Ha, a support plate 14H and a toggle lever system 8H between support plate and movable platen. The actuation of the toggle lever system 8H takes place by means of a hydraulic cylinder 7H, which is connected by means of suitable hydraulic lines, not illustrated here, with a hydraulic drive 13H, which has a pressure sensor 12H. The supplying of the hydraulic cylinder with a pressure medium, in particular with hydraulic oil, takes place via a proportional valve 5H, which can be actuated by the machine control 1H via a control line 2H. Furthermore, pressure sensors 3H and 4H are provided for the chambers of the hydraulic cylinder lying on both sides of the piston. In addition, a position measurement system 6H is associated with the hydraulic cylinder 7H, in order to be able to measure the travelling distance of the piston and/or of the piston rod and therefore ultimately the travelling distance of the movable platen. Also in the case of hydraulic injection moulding machines, the structural details of a toggle lever system and the way in which the cylinder 7H is connected with the toggle lever system with regard to drive are known to the specialist in the art, so that a more detailed description in this respect is not necessary at this point.

Figure 3:
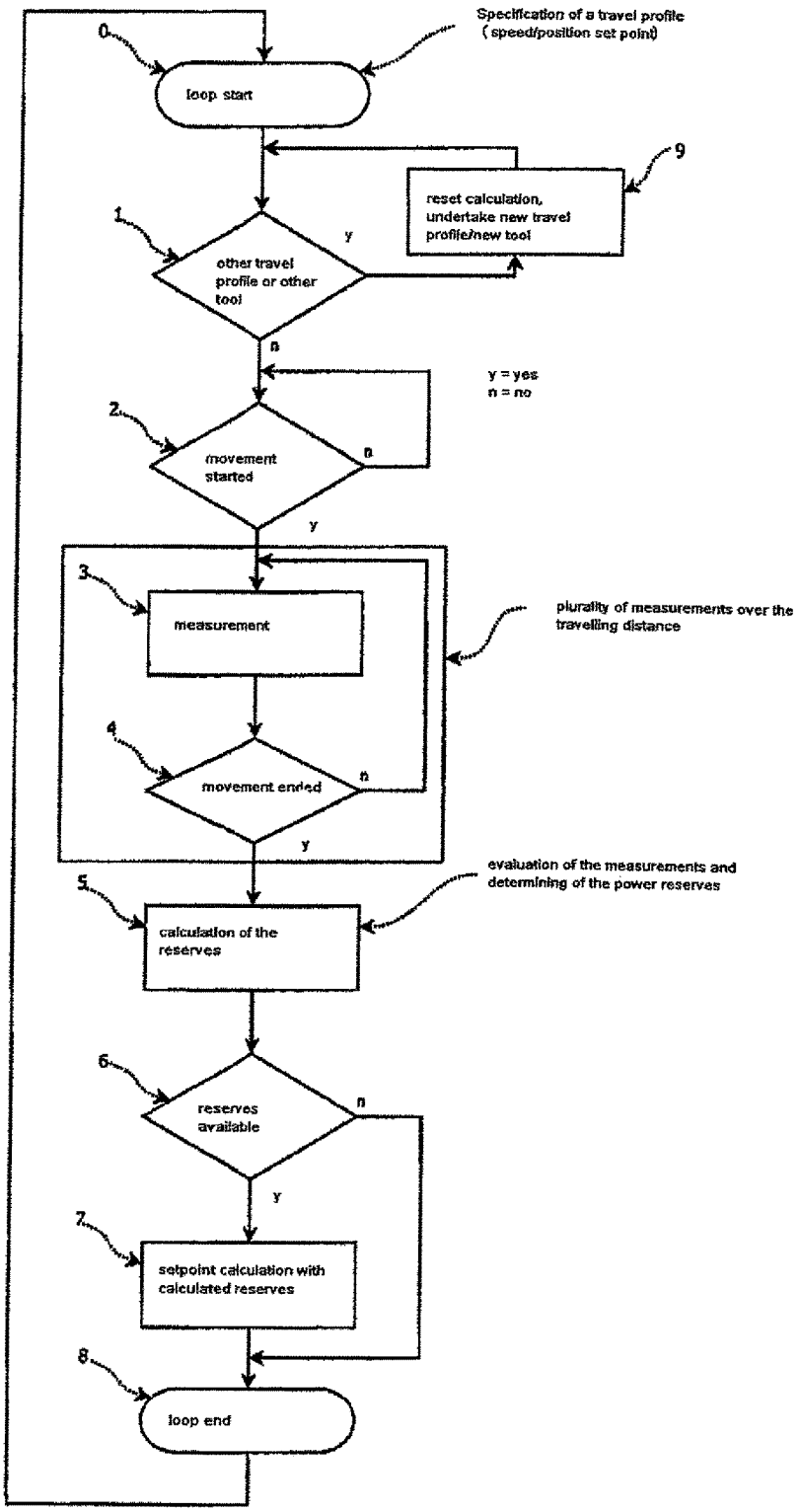
FIG. 3: a flow chart for the method according to the invention

The method according to the invention is now to be explained in further detail with the aid of FIGS. 3, 4a and 4b. At the start of the loop (reference number or respectively step 0) a particular course of a desired speed value for a particular travelling distance on closing or respectively for a particular stroke of the movable platen is specified, for example the curve $v_1$ in FIG. 4a. In the example, the stroke or respectively the travelling distance of the movable platen is to be 150 mm. The speed $v_1$ firstly increases, then it is throttled when the contact of the mould halves of the injection moulding tool is to be expected; thereafter, the locking of the clamping unit takes place with a short acceleration phase, until the speed $v_1$ at the end of the travelling distance drops down to zero. With the speed course $v_1$ a position setpoint course results according to the curve $S_1$ in FIG. 4b. The speed course $v_1$ and the position course $s_1$ form together a specified travel profile for the start of the loop 0.

In the next step (1) a check is undertaken as to whether the clamping unit is to be operated with a different travel profile, for example because a different injection moulding tool with a different travelling distance or respectively with a different stroke is being used. If this is not the case, the clamping movement is started (2), i.e. the movable platen is closed according to the curve $v_1$. At 1 ms intervals, the measurement (step 3) takes place of the parameters which are required for the calculation of the power reserves. In the case of an electric drive (FIG. 1, reference number 4E), the current intensity I (=measurement for the torque) and the rotation speed n are therefore measured at 1 ms intervals.

In step 4 a check is carried out as to whether the movement is completed, i.e. whether the clamping unit is closed. As long as the movable platen, and therefore the movable mould half of the injection moulding tool, are being moved, this is of course not yet the case, and the steps 3 and 4 are repeated. Owing to the short scanning time of 1 ms, the steps 3 and 4 are generally repeated several hundred to several thousand times, depending on how many seconds the movable platen requires in order to cover the desired stroke (here 150 mm).

When the movement is completed and the end of the travelling distance is reached (i.e. the moulding tool has covered the desired stroke), in the next step (5) the calculation of the power reserves takes place. For this, firstly the power maximum $P_{max\text{-}current}$ achieved with this movement sequence is determined and compared with the maximum possible or respectively available power $P_{max\text{-}available}$ of the drive. The difference produces the current power reserve $P_{res}$. In the case of an electric drive, therefore, the course of the product I (current intensity)×n (rotation speed)×torque constant is calculated, and the maximum of this product is determined. By determining the difference with the maximum available or respectively retrievable power of the drive ($P_{max\text{-}available} - P_{max\text{-}current}$), the "remaining" power reserve $P_{res}$ for this clamping travel of the movable platen is obtained. When such a power reserve has been determined, i.e. when reserves $P_{res}$ are present (step 6), a new travel profile can be determined, i.e. in step 7 a new setpoint calculation takes place for a speed course, taking into consideration the power reserves, and from there a return is made to the start of loop (step 0). The entire calculated power reserves can be taken as basis all at once, or only a portion of the power reserves, for the new setpoint calculation. Preferably, only a portion of the power reserves is used for the new setpoint calculation, so that in the next cycle again a power reserve, which is this time somewhat smaller, is determined. From this power reserve, which is then still available, a portion can again be used for the new setpoint calculation, so that in the next cycle possibly again a power reserve—this time even smaller—is determined. Therefore, the power reserve can be determined from cycle and cycle and reduced until a specifiable minimum is reached. Preferably, the minimum lies close to or at zero, i.e. in the optimum state practically no more power reserves are available. This means that the maximum available power of the drive is utilized and consequently also the movement time of the movable platen has become minimal.

Observing the curves $v_1$ to $v_3$ or respectively $s_1$ to $s_3$ in the travel profiles (see FIGS. 4a, 4b), the first movement of the movable platen in step 5 would produce a power reserve of 30%. At step 7, one could then specify a new desired speed value course according to the curve $v_2$ and return to the start of the loop (step 0). On renewed reaching of step 5, the calculation would produce a new power reserve $P_{res}$ of only 20%. The end position 150 mm (i.e. the closed state of the moulding tool) is in this case reached at an earlier point in time ($s_2$). In step 7 one could now specify a new desired speed value course according to the curve $v_3$ and return to the start of the loop etc. Depending on the extent to which the power reserves $P_{res}$ are reduced from cycle to cycle, it is detected earlier or later in step 6 that no more power reserves are available. For the current case of application, the quickest possible movement of the movable platen has been reached. In FIG. 4b it can be seen how through the reduction of the power reserves the reaching of the stroke distance takes place earlier by approximately one tenth of a second (the end shifts in FIG. 4b from right ($s_1$) to left ($s_3$). As a result, therefore, the movement time is reduced to a minimum for a particular case of application.

If a new injection moulding tool is installed at a later time, or another travel profile is specified, the calculation is reset (step 9) and a new optimization algorithm is started.

The invention can be used both for electric and also for hydraulic drives.

In the case of an electric drive, the rotation speed and the torque (or respectively the current intensity) are measured as described above, from the product the power is determined and the maximum of the power is determined in a cycle. In the case of a hydraulic drive, the pressure in one of the cylinder chambers, preferably the pressure in both cylinder chambers, the reservoir pressure and the speed of travel of the piston are measured.

An essential advantage of the invention lies in a shortening of the cycle time and therefore an increase in the machine output. The potential is great especially in small stroke applications, because in these applications, viewed in terms of percentage, a considerable proportion of the cycle time is used for the closing and opening of the tool. In these applications, today the greatest power reserves are present at the drive.

The invention is not restricted to the moving of the movable platen. In an analogous manner, the moving of an ejector, of a core puller, of a plasticizing screw and/or of an injection piston could also be optimized. Basically, the invention is able to be applied to all movable machine parts which are moved forward and back cyclically along travel distances. Therefore, a handling or robot axis could also be optimized accordingly.

When the power reserve is determined, as here, is determined with the aid of a measurement parameter, e.g. the motor current or the piston force, in addition temperature-dependent phenomena, such as for example the friction or the oil compressibility, could also be taken into consideration.

The method according to the invention is not restricted to the operation of injection moulding machines having a toggle lever clamping unit, but rather can be used in all types of clamping units.

What is claimed is:

1. A method for operating an injection moulding machine including one or more movable machine parts, comprising:
   determining and successively reducing a power reserve of a drive operably connected to a movable platen until reaching a specified minimum of the power reserve for the drive as the movable platen, which has fastened thereto a moulding part of an injection moulding tool and is moved cyclically and repeatedly along a specified traveling distance toward and away from a fixed platen between a closing position and an opening position of the injection molding tool, has reached an end position or an opening position;
   defining the specified traveling distance on the basis of a course of a desired speed of the movable platen;
   successively altering the desired speed according to the available power reserves by successively reducing a travel time for covering the specified traveling distance so as to reduce a movement time of the movable platen, sufficient for each case of application of a clamping unit of the injection moulding machine; and
   defining each case of application by a particular weight of the injection moulding tool or of the moulding part of the injection moulding tool and by a particular travelling distance for the moulding part in order to determine and minimize the power reserve of the drive of the movable platen for each case of application.

2. The method of claim 1, wherein the specified minimum is close to zero.

3. The method of claim 1, wherein the specified minimum is less than 10% of a maximum available power.

4. The method of claim 1, wherein the specified minimum is less than 5% of the maximum available power.

5. The method of claim 1, wherein the specified minimum is equal to zero.

6. The method of claim 1, wherein the power reserve of the drive is determined and successively reduced in each cycle.

7. The method of claim 1, wherein the power reserve of the drive is determined and successively reduced from cycle to cycle.

8. The method of claim 1, further comprising continuously measuring a physical parameter as a measuring value during movement of the movable platen along the specified traveling distance for determining the power of the drive.

9. The method of claim 8, wherein plural physical parameters are continuously measured in short time intervals for achieving a plurality of measurement values.

10. The method of claim 8, further comprising:
    evaluating the measuring value at the end of the traveling distance; and
    calculating the power reserve for the movement along the traveling distance; and
    executing the movement in a later cycle by reducing the power or providing a greater power for moving the movable platen.

11. The method of claim 10, wherein the later cycle is a next cycle.

12. The method of claim 1, wherein the power reserve is reduced until a maximum available power of the drive is chosen for moving the machine part.

13. The method of claim 1, further comprising measuring a current intensity and a rotation speed of the drive.

14. The method of claim 1, further comprising:
   measuring a pressure in a cylinder chamber of the drive; and
   measuring a travelling speed of a piston or of a piston rod in relation to the cylinder chamber.

15. The method of claim 1, further comprising altering the desired speed from a cycle to cycle.

16. The method of claim 1, further comprising:
   processing the desired speed to a position setpoint; and
   executing a position regulation of the movable platen in response to the position setpoint.

17. The method of claim 1, wherein the power reserve of the drive connected to the movable platen is determined, when the movable platen has reached a particular state.

18. The method of claim 1, further comprising:
   operably connecting a plurality of drives to the movable platen;
   determining the power reserve of each of the drives independently of one another; and
   successively reducing the power reserves of the drives.

19. The method of claim 18, further comprising defining for each of the drives a same minimum power reserve.

20. The method of claim 18, further comprising defining individually for each of the drives a distinct individual minimum of the power reserve.

21. The method of claim 1, further comprising:
   operably connecting a plurality of drives to the movable platen;
   determining the power reserve of each of the drives independently of one another;
   forming a total the individual power reserves of the drives; and
   successively reducing the total of the power reserves of the drives, until a specifiable minimum has been reached in relation to the total of the power reserves.

* * * * *